United States Patent
McCoy et al.

(10) Patent No.: US 6,937,804 B2
(45) Date of Patent: *Aug. 30, 2005

(54) NON-LINEAR PHOTONIC SWITCH AND METHOD OF MAKING THE SAME

(75) Inventors: Christopher McCoy, Natick, MA (US); John Tsen-Tao Chen, Somerville, MA (US)

(73) Assignee: Surface Logix Inc., Brighton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/336,958

(22) Filed: Jan. 6, 2003

(65) Prior Publication Data

US 2004/0046167 A1 Mar. 11, 2004

Related U.S. Application Data

(60) Provisional application No. 60/344,346, filed on Jan. 4, 2002.

(51) Int. Cl.[7] .................................................. G02B 6/26
(52) U.S. Cl. .......................................... 385/122; 385/16
(58) Field of Search ................................ 385/5, 16–23, 385/129–132; 65/155; 257/21

(56) References Cited

U.S. PATENT DOCUMENTS

| | | | |
|---|---|---|---|
| 4,716,449 A | * 12/1987 | Miller | 257/21 |
| 5,079,321 A | 1/1992 | Sperling et al. | 526/311 |
| 5,103,494 A | * 4/1992 | Mozer | 385/14 |
| 5,557,699 A | 9/1996 | Kester et al. | 385/122 |
| 6,298,180 B1 | * 10/2001 | Ho | 385/15 |
| 6,321,571 B1 | * 11/2001 | Themont et al. | 65/155 |
| 2003/0133677 A1 | * 7/2003 | McCoy et al. | 385/122 |

* cited by examiner

*Primary Examiner*—Phan T. H. Palmer
(74) *Attorney, Agent, or Firm*—Kenyon & Kenyon

(57) ABSTRACT

A photonic switch according to the present invention may be formed using one of a selected group of non-linear optical materials. Each of the materials within this group has a refractive index that demonstrates a substantial peak as a function of wavelength, where the peak occurs at a wavelength distinct from the wavelength of the input signal. A method of producing a photonic switch according to the present invention includes fabricating source and drain waveguides using micro-molding or micro-contact printing processes, or MIMIC (micro-molding in capillaries) of a UV-curable polymer. If desired, a gate waveguide may also be formed in part by these processes. The photonic switch also includes a photonic crystal formed from non-linear optical material, which may be formed, for example, using a block copolymer and nanoparticle composite in a MIMIC or μfluidics process. Such a process may employ a functionalized mold material to align the blocks.

11 Claims, 14 Drawing Sheets

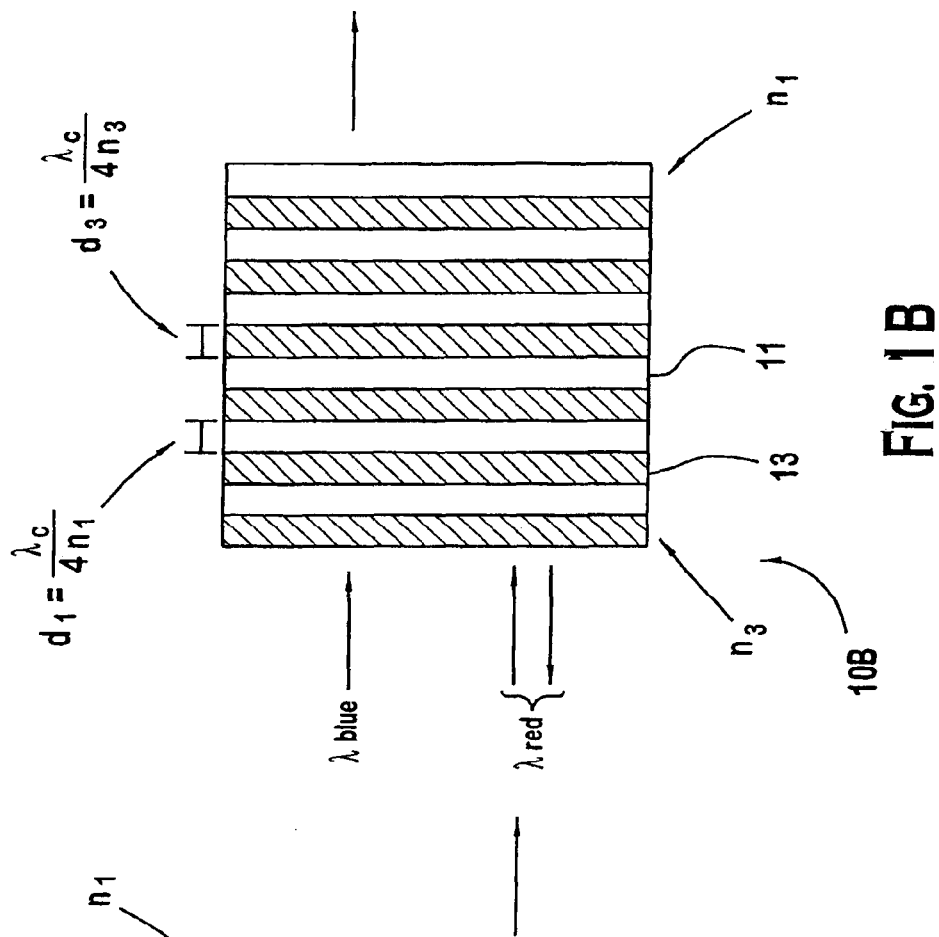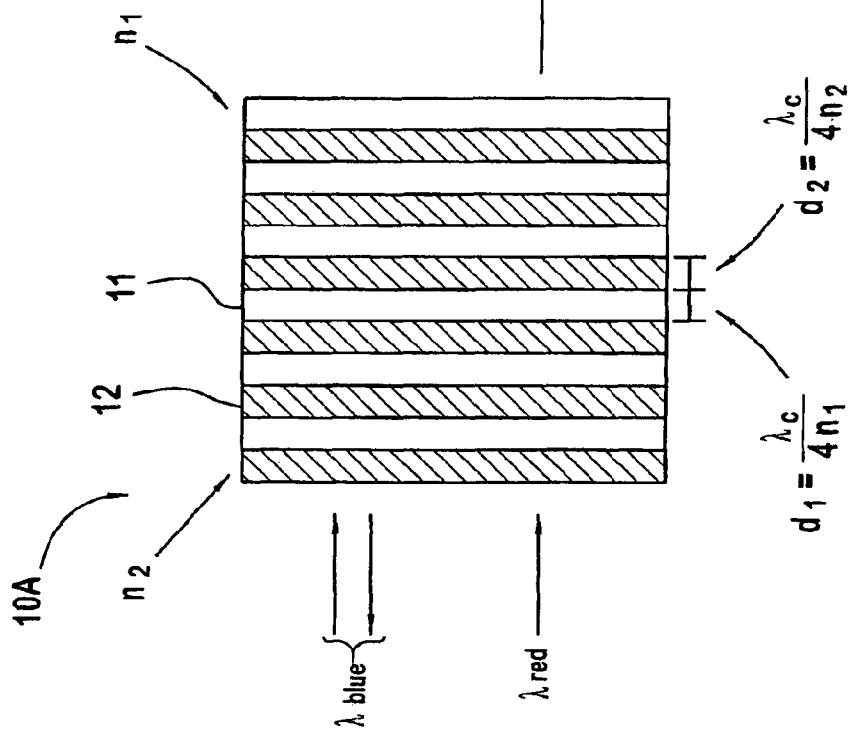

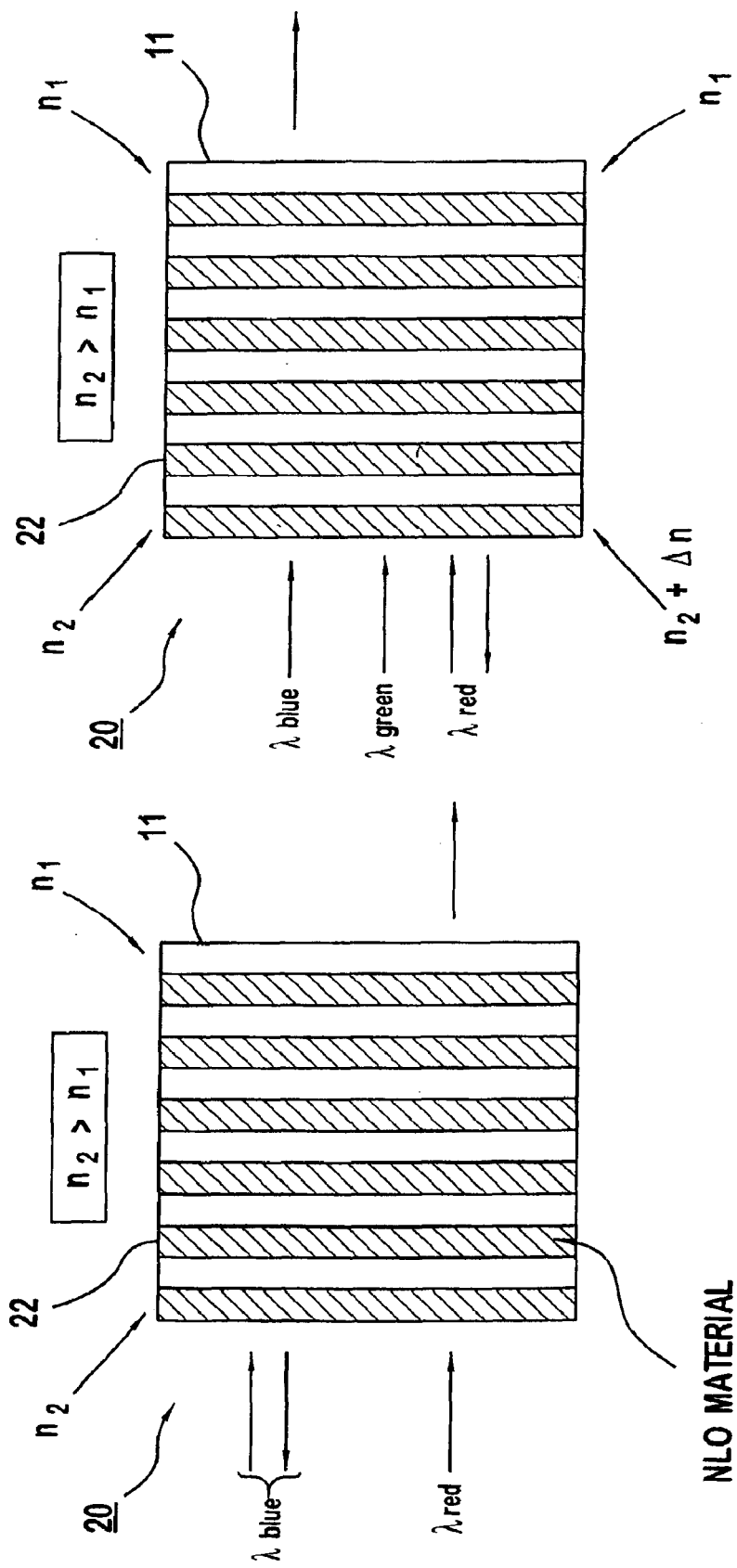

PRIOR ART

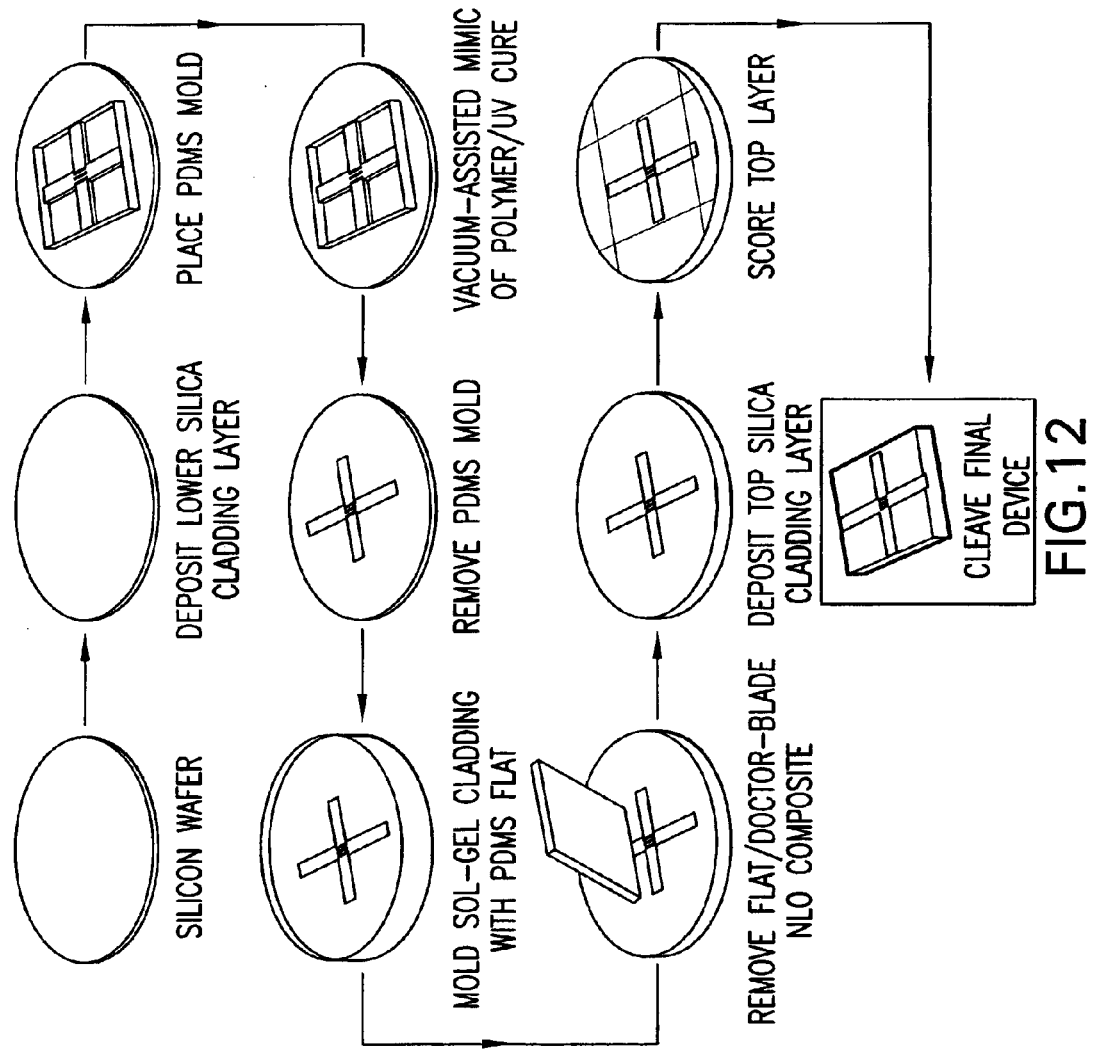

NON-LINEAR PHOTONIC SWITCH AND METHOD OF MAKING THE SAME

RELATED APPLICATIONS

The present application claims the benefit under 35 U.S.C. §119(e) of provisional application No. 60/344,346, filed Jan. 4, 2002, and is related to non-provisional application Ser. No. 10/293,752, filed Nov. 13, 2002, both of which are incorporated herein by reference.

FIELD OF THE INVENTION

The present invention relates to optical circuit devices, and in particular to optical or photonic switches made with a non-linear optical material, as well as methods of making such devices.

BACKGROUND INFORMATION

"Optical" or "photonic" switches allow selective transmission of electromagnetic signals, in particular the selective transmission of light. Photonic switches as used herein refers to any optical coupling or element having a source or input signal, an output or drain signal, and a third "gate" signal that affects the relationship between the source and gain signals. One such type of photonic switch is an optical transistor.

In a known embodiment, an optical switch can be formed using a photonic crystal. FIGS. 1A, 1B and 1C illustrate known one-dimensional photonic crystals. In general, such photonic crystals may be constructed by forming multiple, alternating layers of two materials having differing refractive indexes. If the thickness $d_1$, $d_2$ of each of the layers satisfies certain parameters (shown in FIGS. 1A and 1B), then the photonic crystal will display a "band gap" at certain wavelengths. In the case of one-dimensional (i.e. planar) photonic crystal as shown, the band gap appears for light directed normal to the plane of the device. That is, the photonic crystal will transmit light at wavelengths outside the band gap, but will reflect light of wavelengths falling within the band gap (for light generally orthogonal to the plane of the photonic crystal).

In FIG. 1A, for example, photonic crystal 10A is formed using alternating layers of a first material 11 having a refractive index $n_1$, and a second material 12 having a refractive index $n_2$. If the thicknesses $d_1$ and $d_2$ of the two layers are constructed to satisfy the equations $d_1=\lambda_c/4n_1$ and $d_2=\lambda_c/4n_2$, then photonic crystal 10A will display a band gap around wavelength $\lambda_c$. This exemplary band gap function is denoted by numeral 16 in FIG. 1C. As can be seen in the Figures, blue light, for example, having a wavelength $\lambda_{blue}$ falling within band gap 16, may be reflected by photonic crystal 10A. In contrast, red light having a wavelength $\lambda_{red}$ falling outside band gap 16 may be transmitted by photonic crystal 10A. These results are illustrated schematically in FIG. 1A. It should be noted that the red and blue colors and wavelengths specified herein are completely exemplary, and are utilized purely as a matter of convenience and clarity.

FIG. 1B illustrates a second photonic crystal 10B formed with layers of first material 11, having refractive index $n_1$, and third material 13, having refractive index $n_3$. In this case, assuming $n_3 > n_2$, as designated in FIG. 1C, the band gap of photonic crystal 10B may be shifted, for example, to higher wavelengths, as shown by the reference number 17 of FIG. 1C. In contrast to the photonic crystal 10A, in this case (again by way of example) blue light having a wavelength $\lambda_{blue}$ falls outside band gap 17, and therefore may be transmitted by photonic crystal 10B. Also in contrast to photonic crystal 10A, red light having a wavelength $\lambda_{red}$ falls within band gap 17, and therefore may be reflected by photonic crystal 10A. These results are illustrated schematically in FIG. 1B.

An optical switch may be formed from a photonic crystal by using a non-linear optical material in place of second material 12 or third material 13. Suitable non-linear optical materials may include doped glass-based materials or composites using polymers or sol-gel precursors as a host material as discussed in greater detail below. In a non-linear optical material, the refractive index changes non-linearly as a function of electric field strength and linearly with intensity, according to the function shown in FIG. 2C, where $X^{(3)}$ is a material-dependent function of wavelength. In this manner, the refractive index difference between the two materials forming the photonic crystal can be adjusted, causing a shift in the device's band gap.

FIGS. 2A, 2B and 2C illustrate a photonic crystal 20 formed from a first material 11 and a non-linear optical material 22, which has a refractive index that changes linearly with changing intensity and non-linearly with changing wavelength. As illustrated in FIG. 2A, when no gate signal is applied to photonic crystal 22, it obtains a band gap function as shown, for example, by reference number 26 of FIG. 2C. In contrast, when a gate signal such as $\lambda_{green}$ is applied, as shown in FIG. 2B, the difference of the refractive indices of non-linear optical material 22 and first material 11 increases. This increased ratio results in a shift in the band gap, for example to the function denoted by reference number 27 of FIG. 2C. The materials, thicknesses, and wavelength employed are selected so that a selected wavelength of an input signal falls within the first band gap 26, but outside the band gap 27 (as shown with $\lambda_{blue}$), or vice versa (as shown with $\lambda_{red}$). Gate signal $\lambda_{green}$ can therefore be selectively applied to selectively transmit or reflect input signal $\lambda_{blue}$ or input signal $\lambda_{red}$, provided that $\lambda_{blue}$ and $\lambda_{red}$ are of such intensity as to not shift the band gap themselves.

It should be noted again that the colors and wavelengths specified herein are exemplary. In practice, given a selection of materials, a certain device may gate a red source signal with a blue gate signal, or vice versa. More generally, it may be possible to gate any particular color of light with another color, given a proper selection of materials and design parameters. The exemplary colors used herein for clarity should not be viewed as limitations on the scope of the invention.

Current photonic switches constructed in this manner suffer a number of shortcomings. In some cases, the incidence of a gate signal and input signal each affect the refraction index of the non-linear optical material. Thus the signals must be carefully controlled, so that the input signal itself does not adversely affect the desired shift in the band gap. Current photonic switches may also suffer interference effects between the input and gate signals that carry through to the output signal, so that the gate signal contaminates the output signal. This may occur, for example, when the input signal and gate signal are co-axial, or have substantial components in the same direction. In addition, construction of photonic crystals as described is often a time-intensive or rigorous procedure.

SUMMARY OF THE INVENTION

A photonic switch according to the present invention may be formed using selected non-linear optical materials. The selected non-linear optical materials have a refractive index that demonstrates a substantial peak as a function of wavelength, where the peak occurs at a wavelength distinct from the wavelength of the input signal. The formation of a photonic switch according to the present invention allows the switch to obtain a positive gain, and thus act as a photonic transistor. In addition, a photonic switch according to the present invention may be formed so that a gate signal is applied in a direction that is substantially perpendicular to the direction of the input signal (i.e., so that there is no effective contamination of the input signal by the gate signal affecting the output signal).

A method of producing a photonic switch according to the present invention includes fabricating source and drain waveguides using micro-molding or micro-contact printing processes, or MIMIC (micro-molding in capillaries) of a UV-curable polymer. Micro-molding, micro-contact printing and microfluidics processes are discussed more generally in e.g., Xia, Y. and Whitesides, G. M., "Soft Lithography", *Angew. Chem. Int. Ed.*, 37: 550–575 (1998). If desired, a gate waveguide may also be formed in part by these processes. The photonic switch also includes a photonic crystal formed from non-linear optical material, which may be formed, for example, using a block copolymer and nanoparticle composite in a MIMIC or µfluidics process. Such a process may employ a functionalized mold material to align the blocks.

BRIEF DESCRIPTION OF THE DRAWINGS

FIG. 1A is a cross-sectional schematic view of a conventional photonic crystal.

FIG. 1B is a cross-sectional schematic view of another conventional photonic crystal.

FIG. 2A is a cross-sectional schematic view of a conventional photonic switch.

FIG. 2B is a cross-sectional schematic view of the photonic switch of FIG. 2A, with an exemplary gate signal applied.

FIG. 12 illustrates a flow diagram of an exemplary method of producing a photonic switch according to the present invention.

DETAILED DESCRIPTION

Figure 1C:
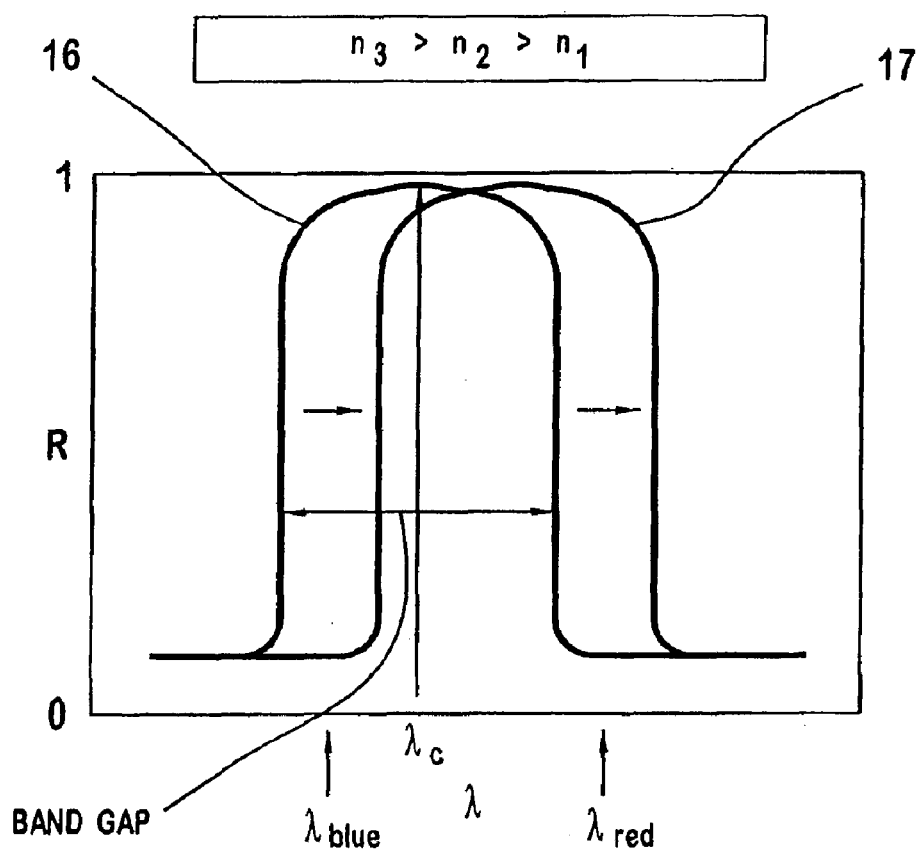
FIG. 1C is an exemplary graph of band gap functions formed by the photonic crystals of FIGS. 1A and 1B.

FIGS. 3 through 6 illustrate embodiments and features of a photonic switch according to the present invention. In general, a photonic switch 30 according to the present invention is illustrated schematically in FIG. 3, and could include any type of optical coupling, transistor, or the like. Photonic switches as described herein generally act on a source or input signal, using a gate signal, to influence or produce a given drain or output signal.

In the illustrated embodiment, photonic switch 30 includes a base wafer or substrate 31, which may be formed of any suitable material, for example silicon or glass. Source waveguide 33 and drain waveguide 35 are provided on opposite sides of photonic crystal 39. Source and drain waveguides 33, 35 are preferably formed from any suitable materials, for example silicon, silica, silicon oxynitride, cured sol-gel materials, UV curable polymers or other polymers. Photonic switch 30 also includes a gate waveguide 37 for providing a gate signal. It should be understood that photonic crystal 39 may be localized within gate waveguide 37, or may extend throughout the length of gate waveguide 37. Portions of gate waveguide 37 that are distinct from photonic crystal may be formed of a suitable material, for example the materials useful for source and drain waveguides 33, 35. Source and drain waveguides 33, 35 are preferably disposed substantially perpendicular to gate waveguide 37, as discussed further below.

Figure 2C:
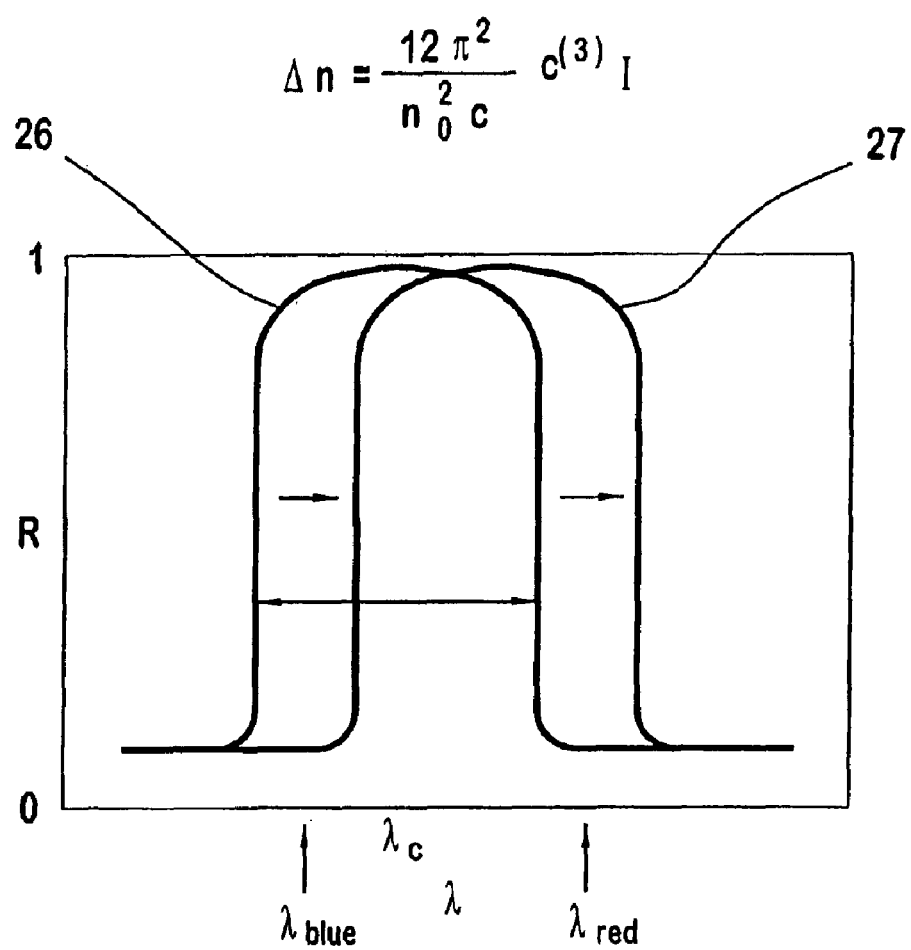
FIG. 2C is an exemplary graph of band gap functions formed by the photonic crystal of FIG. 2A.
Figure 3:
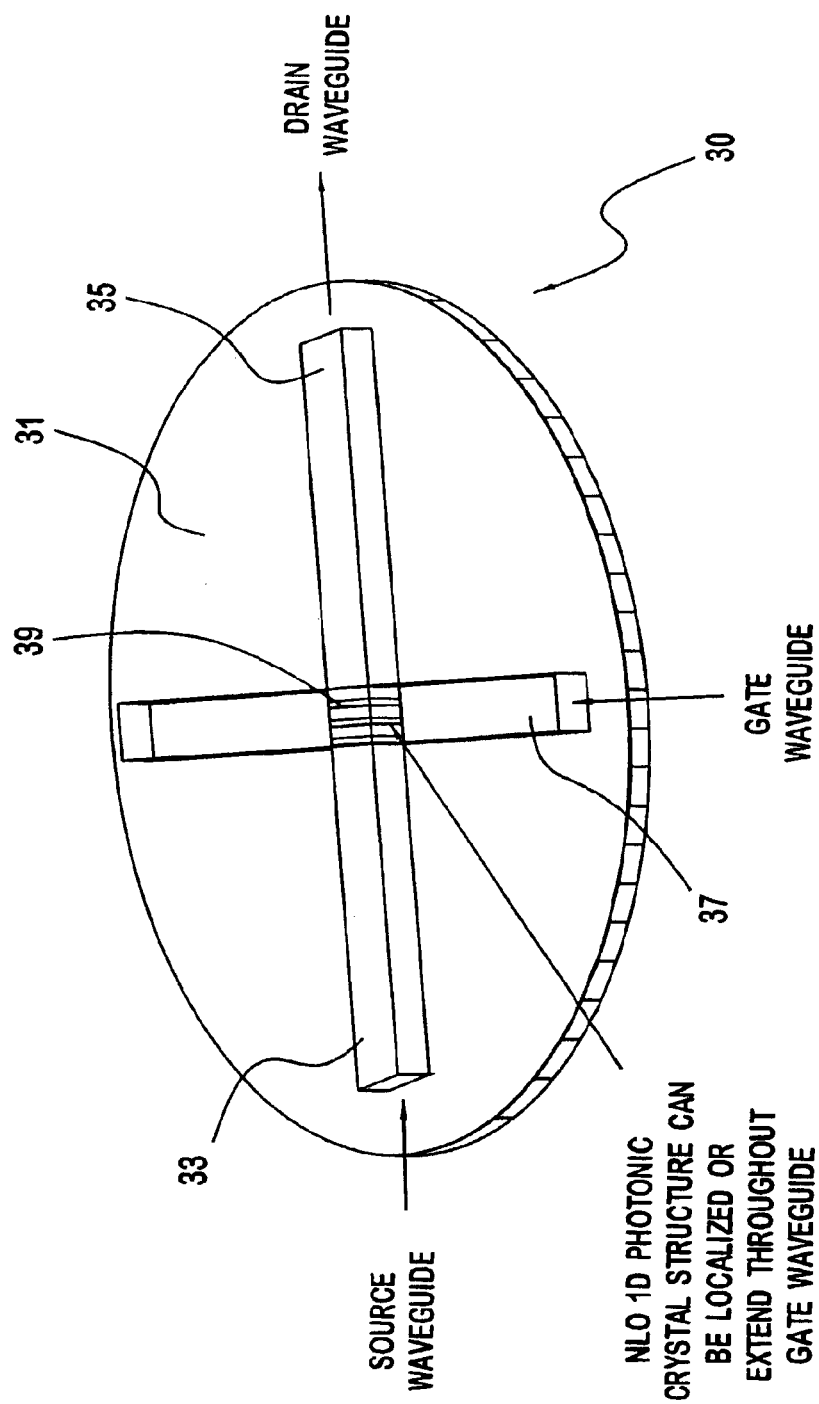
FIG. 3 is a schematic plan view of a photonic switch according to the present invention.
Figure 4:
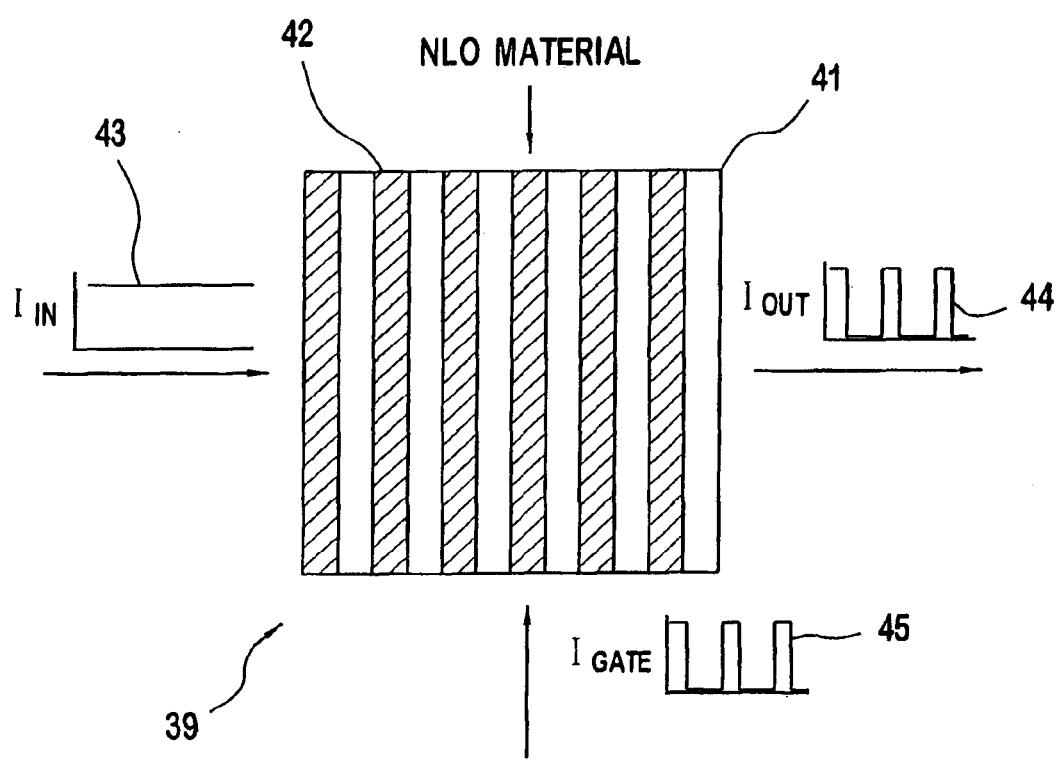
FIG. 4 is a schematic view of a photonic switch according to the present invention.
Figure 5:
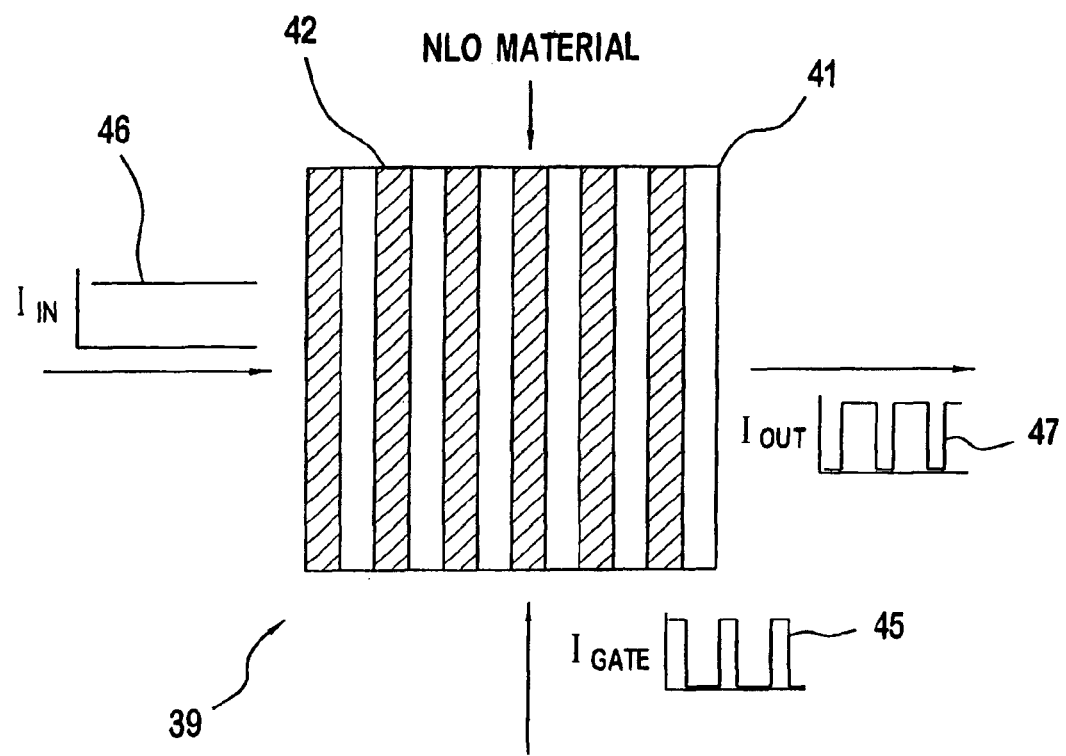
FIG. 5 is a second schematic view of the photonic switch of FIG. 4, with an alternative input signal wavelength.

The photonic crystal 39 and its workings are more particularly illustrated in FIGS. 4 and 5. As shown in FIG. 4, photonic crystal 39 includes a plurality of alternating layers formed by an optically-linear material 41 and a non-linear optical material 42. Alternatively, in another exemplary embodiment, each of the materials 41, 43 is a non-linear optical material, but having $X^{(3)}$ values of opposite sign. As described above, photonic crystal 39 will demonstrate a band gap, reflecting light within certain wavelengths. In addition, the band gap will shift in response to a gate signal 45. Such a shift is graphically represented in FIG. 2C.

As further shown in FIG. 4, an input signal 43 approaches photonic crystal 39 through a waveguide (not illustrated in FIGS. 4 and 5). The frequency of the input signal 43 is selected so that it generally falls near the edge of a band gap. Specifically, in this illustrated embodiment, input signal 43 falls within the band gap when no gate signal 45 is provided, but outside the band gap when a gate signal 45 is provided. Thus input signal 43 is reflected when no gate signal 45 is applied, but transmitted when gate signal 45 is applied. When the gate signal 45 is modulated as shown in FIG. 4, these parameters result in the illustrated output signal 44. As noted above, the selection of materials and design parameters may guide the selection of wavelength, and in general the colors as used herein are exemplary.

Gate signal 45 may be provided from a direction perpendicular to the direction of input signal 43. This arrangement minimizes interference between input signal 43 and gate signal 45 in the direction of input signal 43, minimizing contamination of output signal 44.

FIG. 5 shows the same photonic crystal 39, but a differing input signal 46. In this case, input signal 46 is selected to fall outside the band gap when no gate signal 45 is applied, but within the band gap when gate signal 45 is applied. If the same modulated gate signal 45 is provided, the system in FIG. 5 displays an output signal 47, which is generally opposite that of output signal 44 in FIG. 4.

Figure 6:
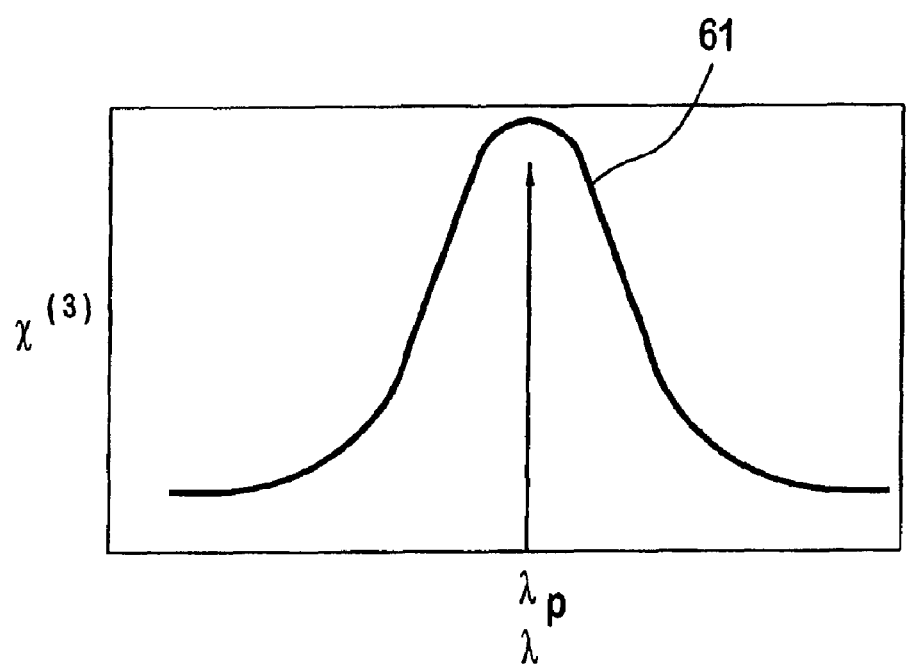
FIG. 6 is a graph illustrating a refractive index peak of a material for use in a photonic switch according to the present invention.

FIG. 6 illustrates a graphical function demonstrating another useful feature of photonic switch 30 according to the present invention. As noted above, in general, a non-linear optical material has a refractive index that is dependent on intensity and wavelength. In photonic switch 30 according to the present invention, the non-linear photonic material 42 may be selected from a group of materials whose refractive index shows a substantial peak 61 at a given wavelength, $\lambda_p$. In other words, the material 42 demonstrates a wavelength-dependent function $X^{(3)}$ with a large or prominent peak value at $\lambda_p$, as shown in FIG. 6.

In this manner, photonic switch 30 can be formed as a photonic transistor. Specifically, photonic switch 30 can be controlled by a gate signal 45 having wavelength equal to or near $\lambda_p$. A gate signal 45 of this wavelength will have a substantial effect on the refractive index of the non-linear optical material 42, because $\lambda_p$ represents the prominent peak wavelength for $X^{(3)}$. In contrast, if the wavelength of the input signal 43 varies widely from $\lambda_p$, it will have far less effect on the refractive index of the non-linear optical material 42. The selection of these materials and wavelengths will therefore allow switching of photonic switch 30 with a gate signal 45 having an intensity significantly lower than the intensity of input signal 43, minimizing interference or other distortion or contamination. In addition, because the variation in the intensity of the output signal 44 (in an absolute sense) is greater than the variation of the gate signal 45, the switch 30 demonstrates a positive gain, and can therefore be considered a photonic transistor.

The optical transistor described above can be used to construct a number of optical logic gates according to the present invention. FIGS. 7 through 11 illustrate a series of logic gates, specifically an inverter, AND, NAND, OR, and NOR gates. In each of these Figures, the gates are constructed using two different types of optical transistor. The first type gates a first color (for example blue) with a second color (for example red), while the second type gates the second color with the first color.

Thus in the exemplary embodiments of FIGS. 7 through 11, optical transistor 205 gates a blue source channel 201 with a red gate, while optical transistor 207 gates a red source channel 203 with a blue gate. In the exemplary embodiments, the blue source channel is a 415 nm signal, for example formed by a GaN laser, while the red source channel is a 760 nm signal, for example formed by a AlGaAs laser. Thus for optical transistor 205, the transistor 205 will output a blue signal in response to a positive red gate signal, and will output no signal when no red gate signal is present. Likewise, for optical transistor 207, the transistor 207 will output a red signal in response to a positive blue gate signal, and will output no signal when no blue gate signal is present.

In each Figure, the gate signals are provided by the input or inputs to the logic gate, which result in a single output or drain channel for each logic gate. The input and output signals, as well as internal signals between optical transistors 205, 207, are carried by waveguides 211. It should be understood that each optical transistor 205, 207 is formed with a specific set of materials and design parameters that may be unrelated to the materials and design parameters of the other optical transistor 207, 205. It should also be understood that the colors blue and red are exemplary, and used for purposes of clarity.

Figure 7:
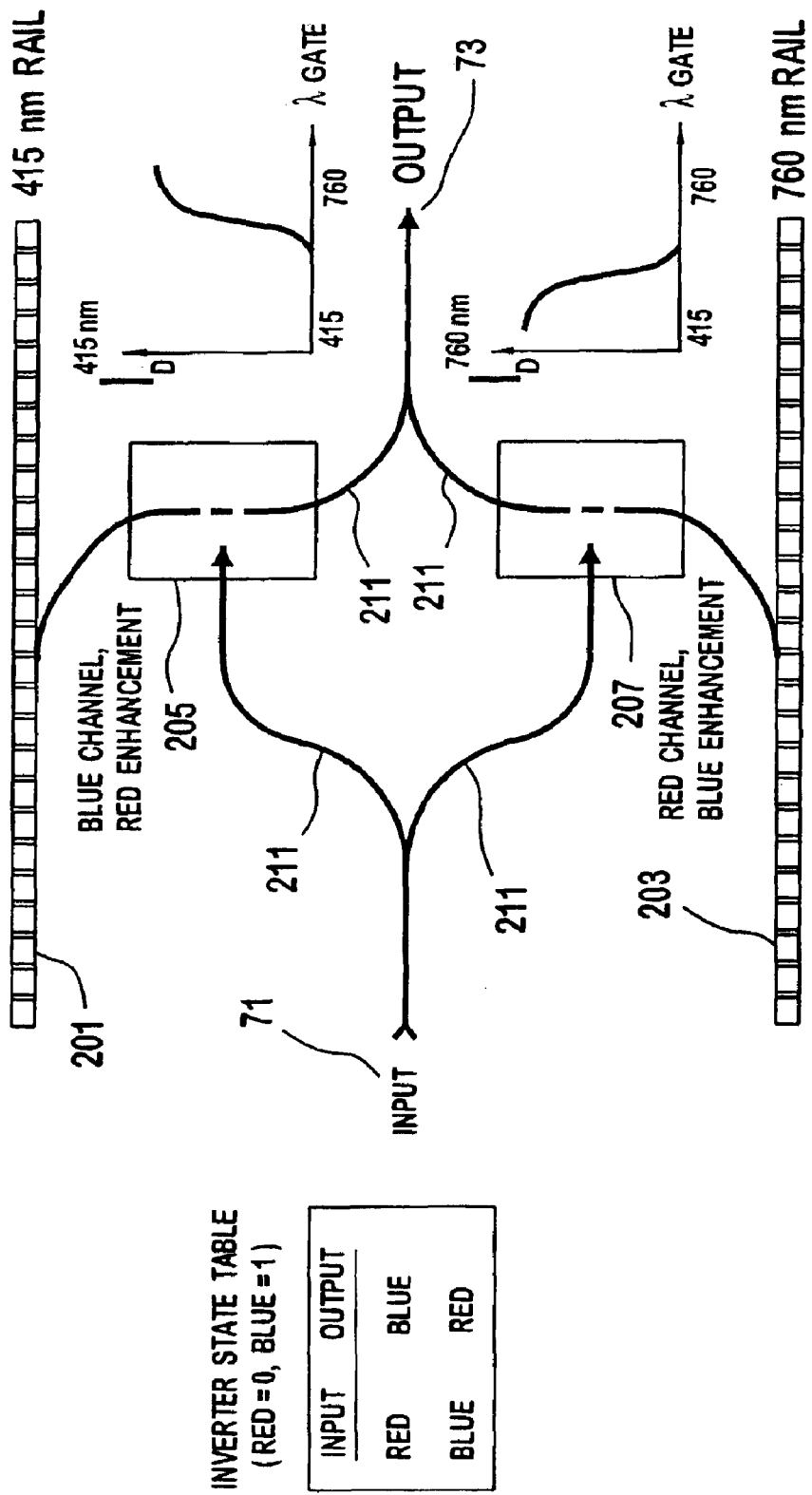
FIGS. 7 through 11 are schematic illustrations of exemplary logic gates according to the present invention.

FIG. 7 schematically illustrates a photonic inverter gate according to the present invention. Input signal 71 is provided as either red or blue. Output signal 73 is red or blue according to the Inverter State Table provided in FIG. 7.

Figure 8:
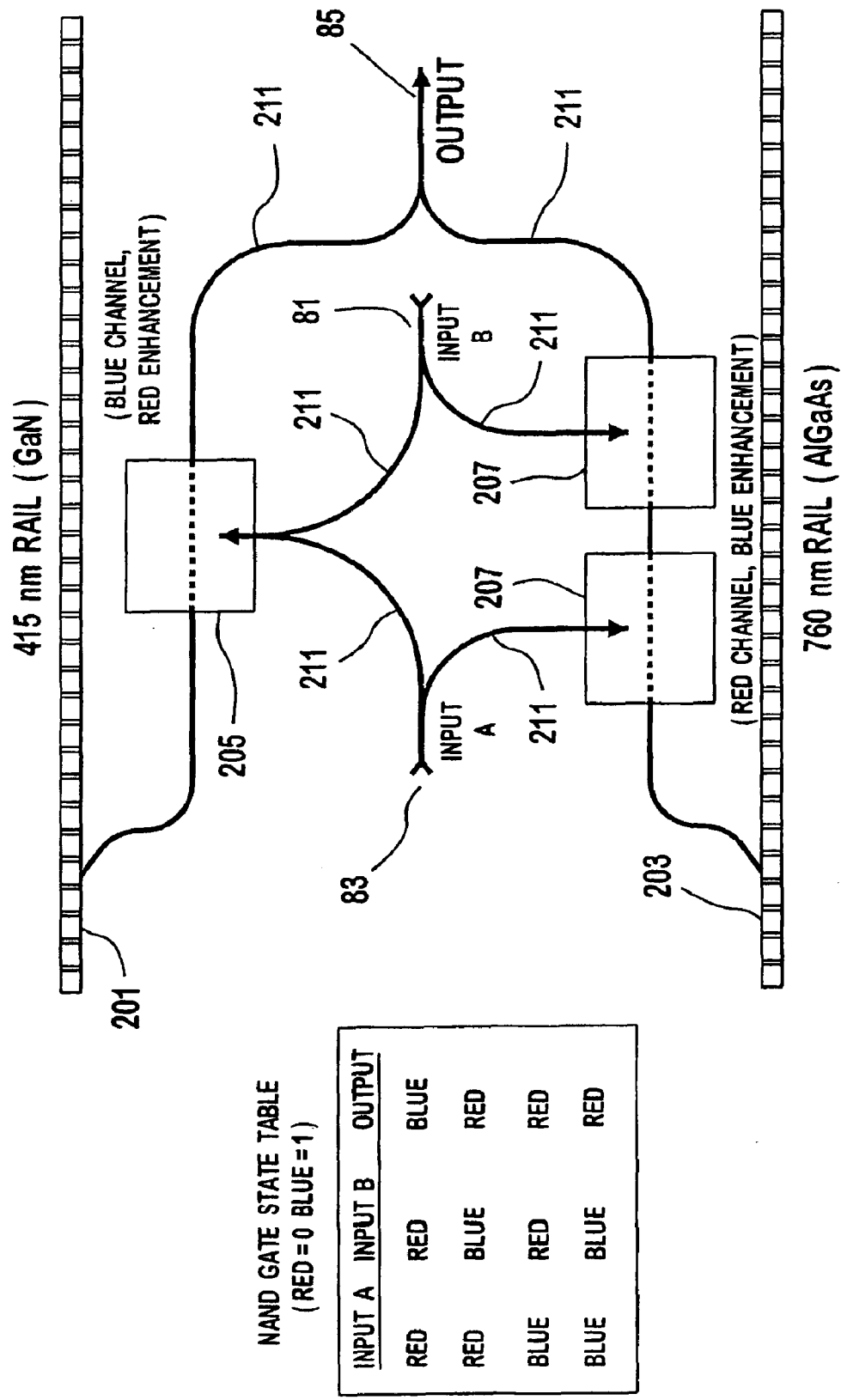

FIG. 8 schematically illustrates a photonic NAND gate according to the present invention. A pair of input signals 81, 83 are each provided as red or blue. Output signal 85 is red or blue according to the NAND State Table provided in FIG. 8. It should be noted that the multiple inputs 81, 83 to a single optical transistor 205 differs from the analogous circuitry of a corresponding electronic NAND gate, where such multiple inputs would cause a short circuit. Likewise, the two optical transistors 207 provided in series differ from the analogous circuitry of a corresponding electronic NAND gate. Here the series connection is possible because the gate signal is an absolute (a wavelength) rather than a voltage, which is measured relative to source and drain. These distinguishing features are present in the optical logic gates shown in FIGS. 9 through 11, as well.

Figure 9:
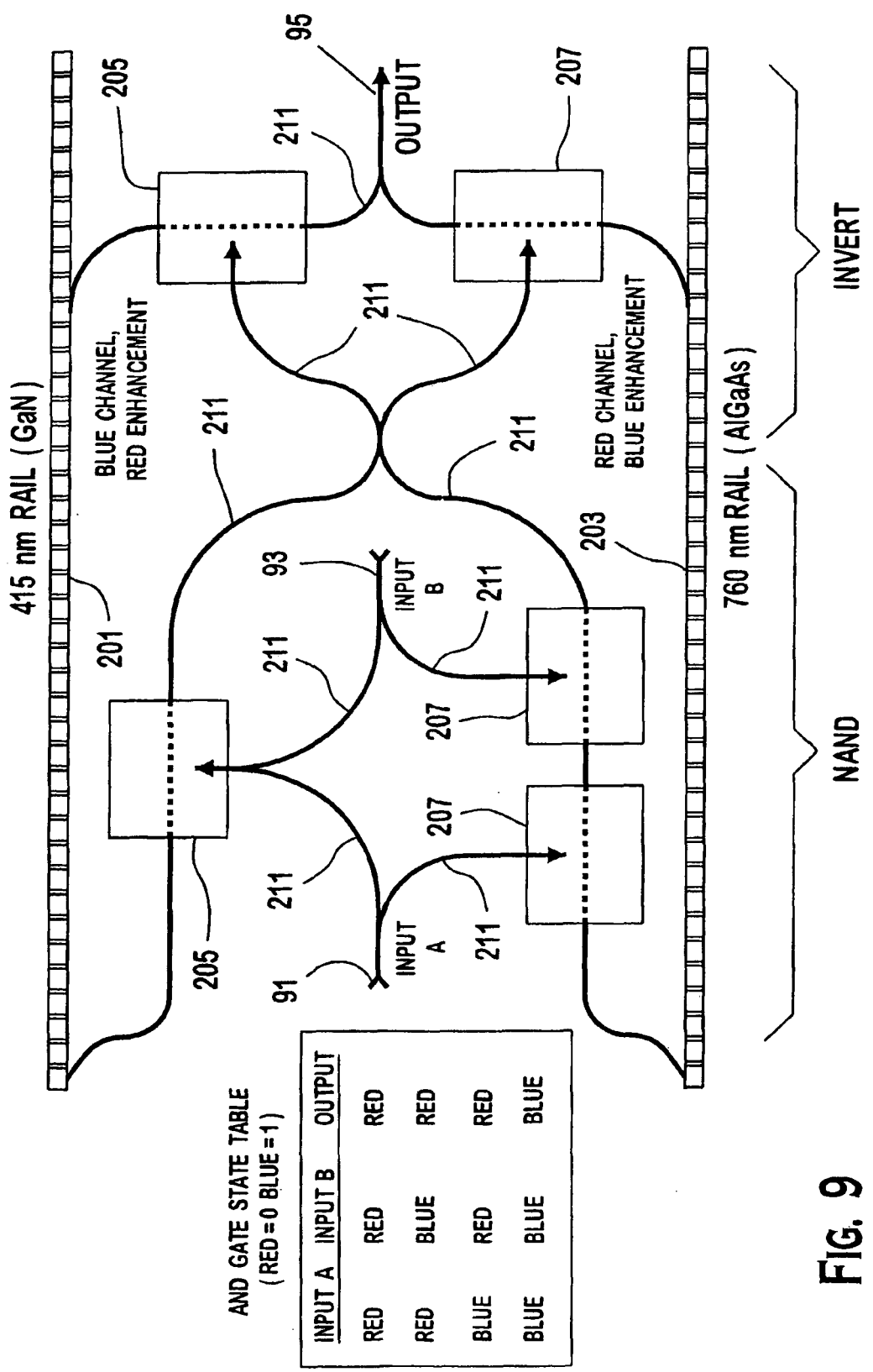

FIG. 9 schematically illustrates a photonic AND gate according to the present invention. A pair of input signals 91, 93 are each provided as red or blue. Output signal 95 is red or blue according to the AND State Table provided in FIG. 9.

Figure 10:
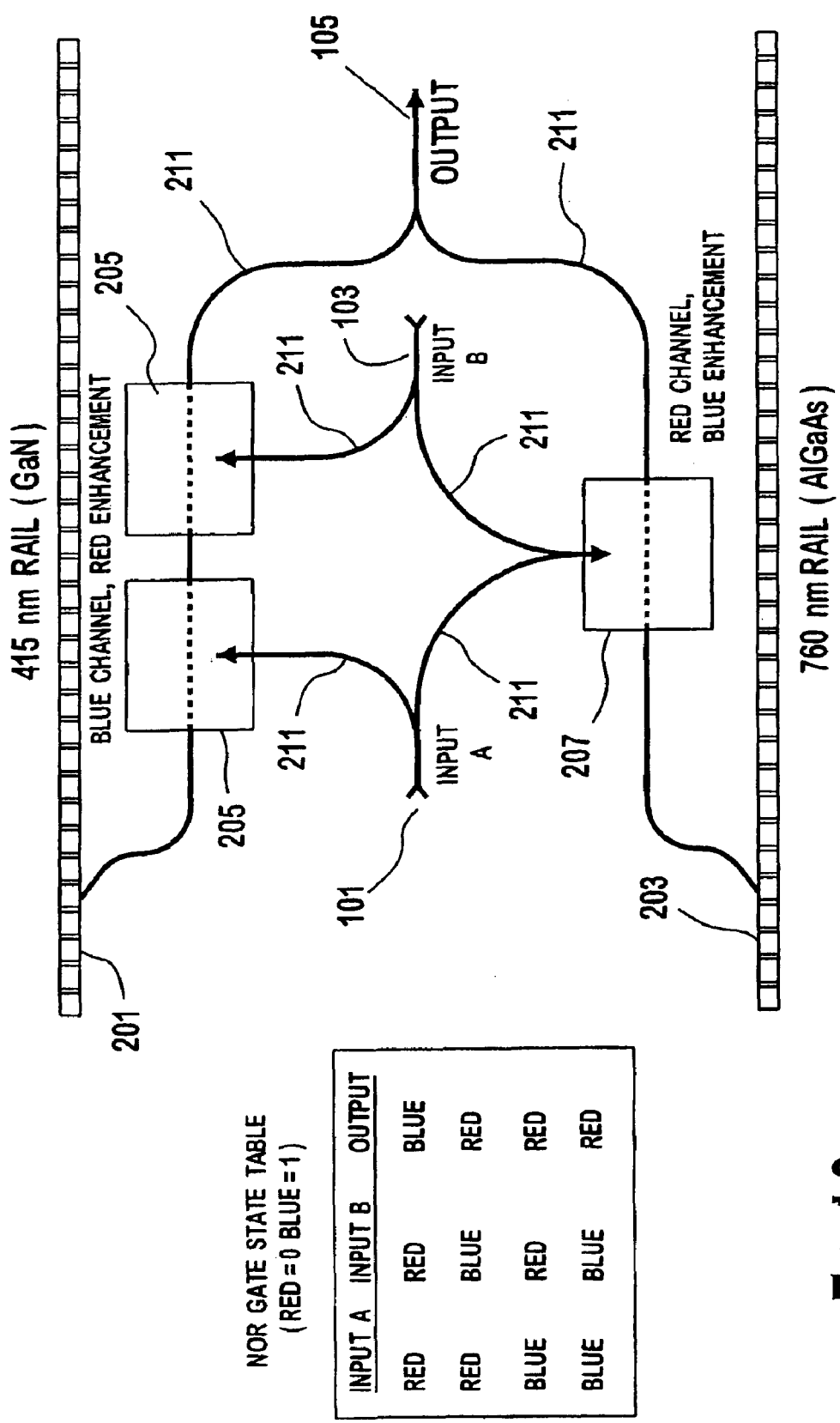

FIG. 10 schematically illustrates a photonic NOR gate according to the present invention. A pair of input signals 101, 103 are each provided as red or blue. Output signal 105 is red or blue according to the NOR State Table provided in FIG. 10.

Figure 11:
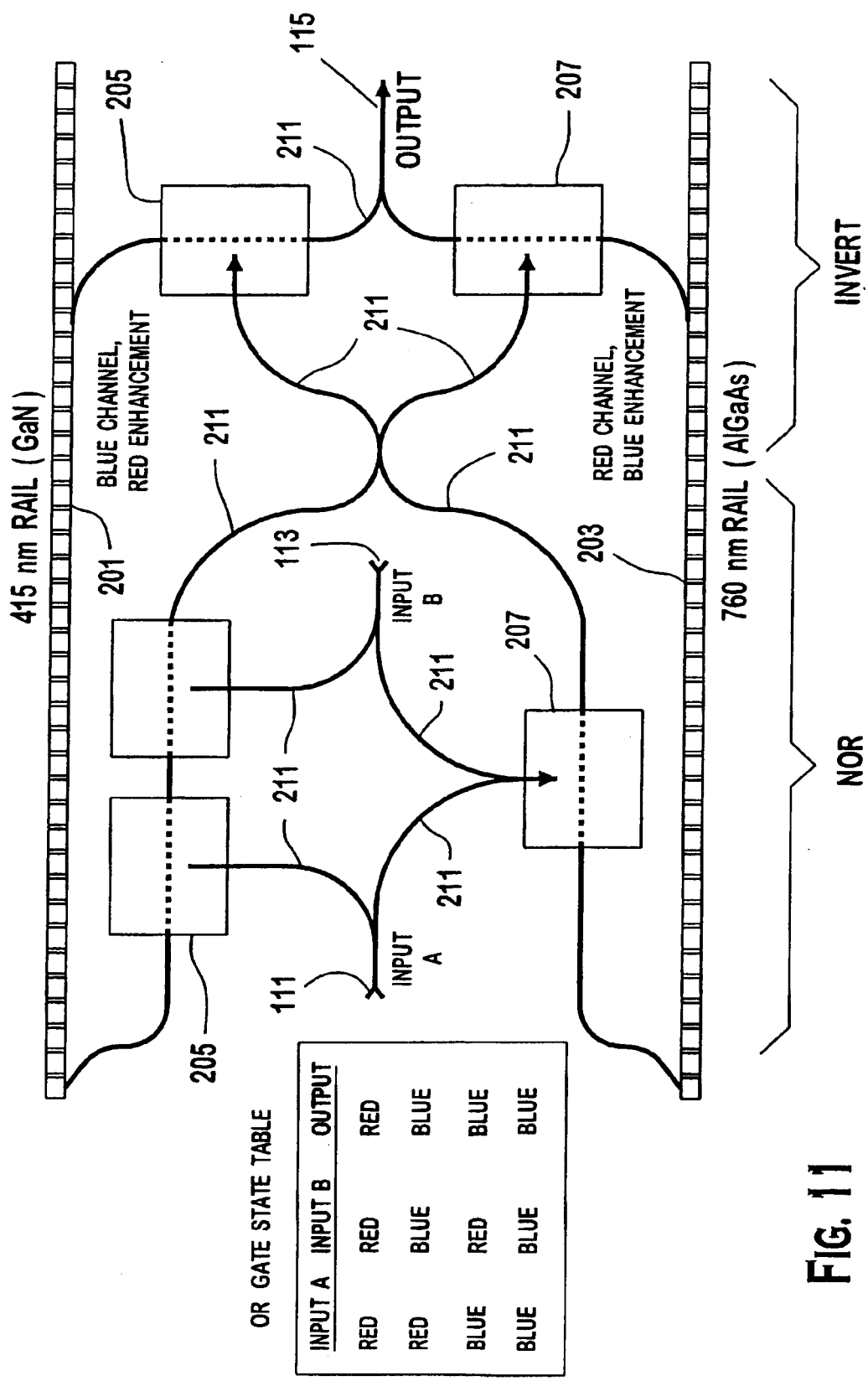

FIG. 11 schematically illustrates a photonic OR gate according to the present invention. A pair of input signals 111, 113 are each provided as red or blue. Output signal 115 is red or blue according to the OR State Table provided in FIG. 11.

Non-linear optical materials for use with the present invention may exhibit other useful properties, in addition to the wavelength-dependent $X^{(3)}$ with large peak value. For example, the materials may have refractive indices between 1.2 and 3.5, as found in a number of optically useful materials. In addition, the non-linear optical material may exhibit low optical loss, allowing for a more complete transmission of the input signal to drain waveguide 65. Also, the non-linear optical material may act as a gain medium, thereby optically amplifying the output signal.

Suitable non-linear optical materials, as well as suitable optically-linear materials, include organic, inorganic, and hybrid materials. Suitable organic materials may include non-linear optical polymers, optically-linear polymers, UV curable polymers, liquid crystals, block copolymers or other self-assembling polymers, or small molecules. Composites of such materials may also be useful. Inorganic materials may include various semiconductors, metals, oxides, carbides, nitrides, ceramics, or nanoparticles. Nanoparticle materials themselves may include any of the materials described herein. Hybrid materials may include sol-gel precursors or polymer/nanoparticle composites (either block copolymers or other suitable polymers). The latter materials may be particularly useful, exhibiting wavelength dependent refractive properties with high $X^{(3)}$ peak values.

In one embodiment, the non-linear optical material used for the high refractive index layers of the stack may possess a $X^{(3)}$ that is strongly peaked only at the gate wavelength (as shown in FIG. 6). The stronger the non-linear optical response is at the gate wavelength as compared to the signal wavelength, the greater the resulting gain of the photonic transistor. Non-linear optical materials with this kind of response have been previously developed using glass-based systems containing a minority concentration of metal, semiconductor, or metal salts. In these materials, the location of the peak in $X^{(3)}$ as a function of wavelength is also found to be sensitive to the size of the nucleated grains that form in the glass. As a result, the peak can be tailored to whatever wavelength of light is chosen as the gate beam.

In a further embodiment, instead of glass, suitable composites may be formed using polymers or sol-gel precursors as a host material. Metal (e.g. Au, Ag, Cu, or other suitable metals) or semiconductor (e.g. CdSe, CdS, or other suitable semiconductor) nanoparticles ranging, for example, from 5 nm to 50 nm in size, may be synthesized separately using proven wet chemistry techniques and incorporated into the polymer or sol-gel to impart non-linear optical functionality. The surface chemistry of these nanoparticles can be specifically tailored to maximize their dispersion into the polymer or sol-gel host. Once made, the nanoparticles can be processed in solution with the polymer or sol-gel host to form a homogeneous composite. In the final photonic transistor device, if greater than unity gain does not arise from the non-linear optical material alone, active optical amplification can be designed into the material, if desired.

In a method of making a photonic switch according to the present invention, a photonic switch 30 includes source and drain waveguides 33, 35 that may be fabricated using micro-molding or micro-contact printing processes, or MIMIC of a UV-curable polymer. If desired, a gate waveguide 37 may also be formed in part by these processes. The photonic switch 30 also includes a non-linear optical material photonic crystal 39, which may be formed, for example, using a block copolymer and nanoparticle composite in a MIMIC or μfluidics process. Such a process may employ a functionalized mold material, for example an elastomer such as polydimethylsiloxane, to align the blocks.

In a MIMIC process, for example, the opposing surfaces of channels within a PDMS mold could be treated by surface chemistry to yield a surface preferential for one of the blocks, thereby templating phase separation of the block copolymer in a direction normal to the channel walls.

In an alternative fabrication method, micro-molding, micro-contact printing or a MIMIC process could be used to form source and drain waveguides 33, 35 and gate waveguide 37, as well as the optically-linear portions of photonic crystal 39. This could occur in multiple steps or as a single process step. Non-linear optical material may then be placed within the gaps between the optically-linear portions of the photonic crystal 39, using any suitable process such as those mentioned above.

For example, FIG. 12 shows an exemplary process flow for fabrication of a photonic transistor according to the present invention. In the first soft lithography step, a PDMS mold may be generated that has the negative relief structure of the overall device. In particular, the mold has channels for defining the source, drain, and gate waveguides as well as the lower refractive index layers of a one-dimensional PBG stack. Accordingly, in this embodiment, all of these structures will be made of the same material and share the same optical properties. The PDMS mold is placed onto a wafer substrate such as a silica coated wafer substrate, and sealed by allowing the PDMS to wet the substrate. Vacuum-assisted MIMIC may then be used to draw, for example, a UV-curable polymer precursor into the channels. Once the channels are filled, the polymer may be solidified. In the case of a UV-curable polymer, this can be achieved by crosslinking by exposure to UV radiation through the PDMS mold. Once the PDMS mold is removed, the high index cores of the source, drain, and gate waveguides remain as well as the low index layers of the one-dimensional PBG stack.

At this point, a PDMS flat may be placed onto the device and used to MIMIC another UV curable polymer with lower refractive index. This layer can form a cladding layer for the waveguides, either alone or in conjunction with additional layers, as suitable. In the next step, a PDMS blade is used to coat the non-linear optical material (such as nanoparticles with polymer or sol-gel) into the empty cavities between the low index layers of the one-dimensional stack. After UV, thermal, or other curing of the non-linear optical layers, a final top cladding layer is deposited onto the photonic transistor. The finished device can then be diced and tested. Because soft lithography uses flexible elastomeric stamps and molds, photonic and electronic devices can also be fabricated on unconventional surfaces such as flexible and curved substrates. These processes may be utilized in both sequential batch processing and continuous roll-to-roll web-based processing.

The device according to the present invention has been described with respect to several exemplary embodiments. It can be understood, however, that there are many other variations of the above-described embodiments which will be apparent to those skilled in the art, even where elements have not explicitly been designated as exemplary. It is understood that these modifications are within the teaching of the present invention.

What is claimed is:

1. A non-linear photonic switch comprising:

a source waveguide for receiving an input signal;

a photonic crystal having a first side coupled to the source waveguide, a second side, and a third side;

a gate waveguide coupled to the third side of the photonic crystal for receiving a gate signal; and a drain waveguide coupled to the second side of the photonic crystal for propagating an output signal;

wherein the photonic crystal includes a first non-linear optical material having a refractive index that demonstrates a substantial peak as a function of wavelength at a gate wavelength.

2. The non-linear photonic switch of claim 1, wherein the photonic crystal includes a plurality of alternating layers formed by an optically-linear material and the non-linear optical material.

3. The non-linear photonic switch of claim 2, wherein a non-linear response of the non-linear optical material has a strong peak at the gate wavelength.

4. The non-linear photonic switch of claim 3, wherein the non-linear optical material includes one of a polymer and a sol-gel host material having nanoparticles incorporated therein.

5. The non-linear photonic switch of claim 4, wherein the nanoparticles include at least one of metal and semiconductor nanoparticles ranging between 5 and 50 nanometers in size.

6. The non-linear photonic switch of claim 4, wherein the host material and the nanoparticles form a homogenous composite.

7. The non-linear photonic switch of claim 3, wherein the non-linear response of the non-linear optical material has a strong peak only at the gate wavelength.

8. The non-linear photonic switch of claim 3, wherein the non-linear optical material includes glass having a minority concentration of at least one of metal, semiconductor and metal salt particles.

9. A method of operating a non-linear optical crystal as a light switch, the non-linear optical crystal having a non-linear response that has a strong peak at a gate wavelength, the method comprising:

selectively applying a gate signal near to the gate wavelength transverse to a main direction of light propagation;

selectively transmitting light of a range of wavelengths along the main direction of light propagation depending upon whether the gate signal is applied.

10. The method of claim 9, wherein an intensity of a propagated output signal is dependent upon an intensity of the gate signal.

11. The method of claim 10, wherein the intensity of the output signal exhibits a gain with respect to the intensity of the gate signal.

* * * * *